United States Patent [19]

Horodysky et al.

[11] Patent Number: 4,654,156
[45] Date of Patent: Mar. 31, 1987

[54] SULFURIZED OLEFINS AS ANTIWEAR ADDITIVES AND COMPOSITIONS THEREOF

[75] Inventors: Andrew G. Horodysky, Cherry Hill; Derek A. Law, Pitman, both of N.J.

[73] Assignee: Mobil Oil Corporation, New York, N.Y.

[21] Appl. No.: 775,083

[22] Filed: Sep. 12, 1985

[51] Int. Cl.$^4$ ................................................ C10M 1/38
[52] U.S. Cl. .................................. 252/47; 252/51.5 A
[58] Field of Search ............................. 252/47, 51.5 A

[56] References Cited

U.S. PATENT DOCUMENTS

| | | | |
|---|---|---|---|
| 3,390,086 | 6/1968 | O'Halloran | 44/71 |
| 3,401,118 | 9/1968 | Benoit, Jr. | 252/32.7 E |
| 3,600,327 | 8/1971 | Hu | 252/47 |
| 3,664,955 | 5/1972 | Panzer | 252/47.5 |
| 4,320,017 | 3/1982 | Spence | 252/47 |

Primary Examiner—Y. Harris-Smith
Attorney, Agent, or Firm—Alexander J. McKillop; Michael G. Gilman; Howard M. Flournoy

[57] ABSTRACT

Direct reaction products of (1) elemental sulfur and olefins and (2) resultant sulfurized olefins and amine-containing polymers are effective multifunctional lubricant additives providing antiwear, friction-modifying and thermal and oxidative stability to compositions thereof.

26 Claims, No Drawings

SULFURIZED OLEFINS AS ANTIWEAR ADDITIVES AND COMPOSITIONS THEREOF

This application is related in Ser. No. 831,967, filed Feb. 24, 1986, entitle "Sulfurized Olefins as Antiwear-/Extreme Pressure Additives or Lubricants and Fuels and Compositions Thereof."

BACKGROUND OF THE INVENTION

This invention is directed to sulfurized products prepared by the co-reaction of a sulfurized olefinic compound and a nitrogen-containing polymeric substance containing at least one free amine group, e.g., polyisobutenyl succinimide, which are useful as additives to lubricant compositions, various greases and normally liquid hydrocarbyl or hydrocarbyloxy fuels. This invention is particularly directed to a process of preparing these sulfurized products, the products so prepared and lubricating and fuel compositions containing them. The reaction products prepared in accordance with the invention are highly effective multifunctional antiwear additives which also provide surprisingly improved thermal and oxidative stability coupled with good frictional modifying characteristics.

Sulfurized olefins have been extensively used in many lubricant applications requiring extreme pressure/antiwear activity. These sulfurized olefins which include sulfurized $C_3-C_8$ olefins such as isobutylene are described by A. G. Horodysky in U.S. Pat. Nos. 3,703,504; 3,703,505; and 3,873,454. These patents and U.S. Pat. No. 4,240,958 generally employ methods of preparing their sulfurized products wherein the olefin is sulfohalogenated with a sulfur halide at some stage in their synthesis.

The direct sulfurization of olefins such as triisobutylene with sulfur is described, for example, in U.S. Pat. Nos. 2,995,569, 3,673,090 and 3,796,661. U.S. Pat. Nos. 3,345,380 and 2,535,706 describe methods of making various thiones by reacting elemental sulfur and unsaturated hydrocarbons.

The use of amine-containing polymeric succinimides has also found widespread use in both fuels and lubricants as dispersants and detergent additives. U.S. Pat. No. 3,600,327 teaches reacting sulfur with olefinic polymers and subsequently reacting the product thereof with primary, secondary or tertiary amines, disclosed mixtures of sulfurized additive products and soluble amines. U.S. Pat. No. 3,664,955 discloses reacting elemental sulfur with long chain olefinically unsaturated monomers $C_{16}+$ or polymeric hydrocarbons such as polyisobutylene and using such compounds in conjunction with amine dispersants such as polyisobutenyl succinic anhydride condensed with tetraethylene pentamine. U.S. Pat. No. 3,390,086 discloses a reaction of polyalkylene succinimides with elemental sulfur and U.S. Pat. No. 3,401,118 discloses a preparation of alkenyl succinimides by reacting high molecular weight polyisobutenyl succinic anhydride with tetraethylene pentamine and thereafter reacting the product thereof with low molecular weight polyisobutenyl succinic anhydrides.

However, no prior art patent or publication or other reference known to applicants teaches the direct co-reaction of an olefin with elemental sulfur and the subsequent reaction of the product thereof with an amine-containing polymeric compound as disclosed herein.

SUMMARY OF THE INVENTION

This invention relates to a process of preparing sulfurized organic additive products comprising the reaction products of sulfurized olefins, especially those made by the direct reaction of olefin and elemental sulfur, and amine-containing polymeric compounds. Compositions containing small additive concentrations of these reaction products possess excellent antiwear properties and have significantly improved thermal and oxidative stability. Moreover, the sulfurized olefinic amine-containing polymers unexpectedly demonstrate significantly enhanced frictional properties. This frictional property is especially noted as a reduction in drag of the roller bearings in key lubricant performance tests. Therefore, this invention is also directed to the additive products themselves and to compositions comprising oils of lubricating viscosity or greases prepared therefrom and to liquid hydrocarbyl or hydrocarbyloxy fuels containing same.

The additive products are prepared in general by the reaction of olefinic compounds with (1) elemental sulfur to form products containing significant amounts of sulfur, within a relatively narrow range of temperatures, pressures and ratio of reactants and (2) reacting the product of (1) with a nitrogen-containing amine polymer such as a succinimide. It is believed that this concept can be extended to the reaction of sulfurized olefins with polymeric esters, polymeric ester/amides, and/or borated polymeric esters and/or amide dispersants to form other improved and novel products.

DESCRIPTION OF SPECIFIC EMBODIMENTS

The invention in a particular aspect is directed to lubricant oil additives prepared in a process comprising reacting in a suitable reaction zone an olefinic hydrocarbyl compound having at least one olefinic double bond with elemental sulfur, e.g., the direct reaction of elemental sulfur and isobutylene at high pressure (optionally in the presence of a small catalytic amount of a catalyst such as butylamine) to form a low viscosity liquid containing from about 40 to about 55% sulfur.

The invention is also directed to a composition comprising a major proportion of an oil of lubricating viscosity or grease prepared therefrom or a liquid hydrocarbyl or hydrocarbyloxy fuel and a minor proportion of an additive prepared by a process comprising (1) directly reacting under super atmospheric pressures and temperatures at least one olefinically unsaturated compound or mixtures thereof having from about 2 to about 36 carbon atoms and elemental sulfur in the absence of added hydrogen sulfide, thereby producing a low viscosity liquid containing sulfurized reaction product having at least about 40 to about 55 wt. % of sulfur and (2) thereafter reacting the product of (1) with a nitrogen-containing polymeric compound having at least one free amine group at elevated temperatures for a time sufficient to obtain the desired sulfurized olefin/nitrogen-containing polymeric reaction product.

Although isobutylene may be a preferred olefin, other butylenes, pentenes, propylene and similar olefins can be used. Sulfurized olefins contemplated for use herein can be prepared from any convenient olefinic substance. A wide variety of olefinic substances may be utilized. This includes olefins with terminal or internal double bonds and containing from about 2 to 8 or more carbon atoms per molecule in either straight, branched chain or cyclic compounds and these may be exemplified by ethylene, propylene. 1-butene, cis and trans-2-butene, isobutylene, diisobutylene, triisobutylene, pentene, cyclopentene, hexene, cyclohexene, octene, 1-decene, etc. Also useful are diolefins, for example butadiene, isoprene, divinyl benzene, pinene, p-menthene and limonene. In general, $C_3$ to $C_6$ olefins or mixtures thereof are preferred and more preferably butylenes are desirable for preparing the sulfurized products embodied herein because the combined sulfur content of the product decreases with increasing carbon content and the miscibility of the product with oil is lower in the case of propylene and ethylene derivatives.

In some embodiments of the invention isobutylene is particularly preferred as the predominant olefinic reactant, but it may be employed, desirably in major proportions, in mixtures containing one or more other olefins; moreover substantial proportions of saturated aliphatic hydrocarbons, as exemplified by methane, ethane, propane, butane, pentane, etc. may be contained in the olefinic feed. Such alkanes are preferably present in minor proportions in most instances to avoid unnecessary dilution of the reaction since they neither react nor remain in the product, but are expelled in the off-gases or by subsequent distillation. Such mixed feed can substantially improve the economics of the process since such streams are of lower value than a stream of, for example, relatively pure isobutylene.

Volatile olefins are often readily available in liquid form, and it is usually desirable to utilize olefinic liquids which are vaporized by the heat of reaction, as such evaporation provides a substantial cooling effect that permits the flowing of water for cooling the reactor to be reduced considerably for greater economy. Also there are indications that the use of a volatile liquid olefin reactant may have the unexpected and desirable effect of lowering the viscosity of the final product.

The specific molar ratio of sulfur to olefin may range from about 1.7:1 to about 2.3:1. In the case of butylene, the optimum ratio preferably is from about 1.9:1 to about 2.1:1. However, under some circumstances ratios of about 1.95:1 to 2.05:1 are used. The reaction temperature may range from about 140 to about 180° C., preferably from about 158 to about 170° C. and most preferably is about 160° C. (e.g., 159-161° C.). The reaction pressure is allowed to seek its own optimum level and may range from about 300 to about 900 psi, the preferred pressures are from about 750 to about 850 psi. The reaction is carried out in the absence of added hydrogen sulfide ($H_2S$).

Any suitable nitrogen-containing polymeric substance may be used herein as long as it has at least one free amine group. The polymeric substance may have a molecular weight of from about 300 to about 30,000. Especially preferred are the reaction products of alkenyl succinic anhydrides or alkenyl succinic acids with polyalkylene amines. Particularly preferred is polyisobutenyl succinic anhydride with tetraethylene pentamine.

The polyalkyleneamines include those of the general formula:

$H_2N(CH_2)n—[NH(CH_2)_n]_m—NH_2$ wherein n is preferably 2 or 3 and m is 0 to 10. Examples of such polyalkyleneamines include ethylenediamine, diethylene triamine, tetraethylene pentamine, octaethylene nonamine, tetrapropylene pentamine, etc.

The sulfurized olefin and the nitrogen-containing polymeric material are usually reacted in less than molar or stoichiometric amounts. However, molar amounts may be used if desired. The pressures and temperatures of reaction between the nitrogen-containing compound and the sulfurized olefinic material may be any under which the reaction may be carried out conveniently, such as from about 40 to about 150° C. or more, preferably from about 65 to about 120° C. However, elevated temperatures and pressures may be used if desired. A slow nitrogen purge can also be used to aid in the elimination of any volatile sulfur-containing by-products.

Weight ratios of the nitrogen containing compound, e.g., succinimide: sulfurized olefin may vary from about 1:40 to about 1:1. However, weight ratios of about 1:20 to about 1:5 can be effectively used with about 1:10 to 1:14 often being preferred. The reaction product can be optionally filtered before use.

A mixture of products is believed to form during the reaction in accordance with the invention leading to a surprising multifunctional product with antiwear properties. improved thermal and oxidative stability and improved friction properties especially under severe service.

If instead of prereacting the sulfurized olefin and polymeric amine prior to formulation of a lubricant, the sulfurized olefin is blended first, followed by other nitrogen and/or phosohorus components, followed by the polymeric amine undesirable results are obtained. It is critical to prereact the above two components. Merely adding the components at different times to a lubricant or under non-reaction conditions does not lead to the desirable results demonstrated by this invention.

The compositions hereof may comprise any oleaginous materials where protection aoainst excessive wear under operating conditions is required, but which normally exhibit insufficient anti-corrosion or antiwear properties. Especially suitable for use with the additives of this invention are liquid hydrocarbon oils of lubricating viscosity. Lubricant oils, improved in accordance with the present invention, may be of any suitable lubricating viscosity. In general, the lubricant compositions may comprise any mineral or synthetic oil of lubricating viscosity or mixtures thereof. The additives of this invention are especially useful in greases and in automotive fluids such as brake fluids and power brake fluids, transmission fluids, power steering fluids, engine oils, various hydraulic fluids and gear oils and in liquid hydrocarbyl fuels and hydrocarbyloxy fuels.

In instances where synthetic oils are desired in preference to refined petroleum or mineral oil they may be employed alone or in combination with a mineral oil. They may also be used as the vehicle or base of grease compositions. Typical synthetic lubricants include polyisobutylene, polybutenes, hydrogenated polydecenes, polypropylene glycol, polyethylene glycol, trimethylol propane esters, neopentyl and pentaerythritol esters of carboxylic acids, di(2-ethylhexyl) sebacate, di(2-ethylhexyl) adipate, dibutyl phthalate, fluorocarbons, silicate esters, silanes, esters of phosphorus-containing acids, liquid ureas, ferrocene derivatives, hydrogenated mineral oils, chain-type polyphenols, siloxanes and silicones (polysiloxanes), alkyl-substituted diphenyl ethers typified by a butyl-substituted bis(p-phenoxy phenyl) ether, phenoxy phenylethers, dialkylbenzenes, etc.

As hereinbefore indicated, the aforementioned additives can be incorporated as additives in grease compositions. When high temperature stability is not a requirement of the finished grease, mineral oils having a viscosity of at least 40 SSU at 150° F. are useful. Otherwise those falling within the range of from about 60 SSU to about 6,000 SSU at 100° F. may be employed. The lubricating compositions of the improved greases of the present invention, containing the above-described additives, are combined with a grease forming quantity of a thickening agent. For this purpose, a wide variety of materials can be dispersed in the lubricating oil in grease-forming qualities in such degree as to impart to the resulting grease composition the desired consistency. Exemplary of the thickening agents that may be employed in the grease formulation are metal soaps as well as non-soap thickeners, such as surface-modified clays and silicas, aryl ureas, calcium complexes and similar materials. In general, grease thickeners are employed which do not melt or dissolve when used at the required temperature within a particular environment; however, in all other respects, any material which is normally employed for thickening or gelling oleaginous fluids or forming greases may be used in the present invention.

Generally the lubricants and fuels of the present invention contain an amount of the sulfurized product effective to improve antiwear properties and oxidation and friction modifying characteristics. Normally this amount will be about 0.01–20%, preferably about 0.1–10%. of the total weight of the lubricant or fuel.

The invention also contemplates the use of other additives in amounts up to about 20 wt. % for their intended purpose in combination with the sulfurized olefin product. Such additives include, for example, detergents and dispersants of the ash-producing or ashless type, corrosion-inhibiting agents, auxiliary oxidation-inhibiting agents, pour point depression agents, auxiliary extreme pressure agents, color stabilizers and anti-foam agents. Other such additives include but are not limited to phosphorus, sulfur, nitrogen and/or oxygenated additives, including phosphorodithioates, phosphates, phosphites, imidazolines, oxazolines, esters, metallic phenates, metallic sulfonates, olefin copolymers and the like.

The following examples serve to illustrate the present invention, but are not intended as limitations thereon unless otherwise stated.

EXAMPLE 1

Sulfurized Olefin-Succinimide Reaction Product

Three hundred grams of sulfurized olefin made by the sulfurization of isobutylene with elemental sulfur at super atmospheric pressure at about 160° C. using a sulfur to olefin mole ratio of approximately 2:1 and 0.1% butylamine catalyst and 30g of a 50% concentrate in diluent oil of a polyisobutenyl succinimide (made by reacting polyisobutenyl (M.W. 900) succininic anhydride with tetraethylenepentamine) were charged to a reactor eguipped with heater, agitator and provision for providing a nitrogen sparge. The reactants were heated to 140° C. for about four hours with nitrogen sparge and then cooled to about 120° C. for two additional hours under reduced pressure to remove any volatile materials. The product was cooled and filtered through diatomaceous earth to form a liquid possessing a typical sulfurized olefin odor.

TABLE 1

Improvement in Frictional Properties Using Coordination Research Counsel (CRC) L-37 Test

| | Additive Concentration in Fully Formulated Oil[1] Wt. % | Rating[2] of Frictional Drag of Bearing in L-37 Test |
|---|---|---|
| Sulfurized Isobutylene Used in Example 1 as Reactant | 2.80 | 5 |
| Example 1 - Reaction Product of Above Sulfurized Olefin and Succinimide | 2.80 | 2 |

[1]Test oil is a fully formulated mineral oil containing additionally corrosion inhibiting, copper passivating and phosphorus-containing antiwear additives.
[2]Basis used for rating frictional drag of roller bearing in L-37 test:
0 - Very loose turning bearing with no frictional drag.
2 - Loose turning bearing, but not as loose as rating of 0.
3 - Some frictional drag noted when turning bearing.
4 - Definite bearing drag noted.
5 - Bearing turns with significant drag, difficulty and roughness.
NOTE: Category 4 and 5 exhibit significant stick-slip properties.

As can be clearly seen from the test results, the novel reaction products significantly reduce the friction of the CRC L-37 test bearings when compared to the identical untreated sulfurized isobutylene prior to reaction with the polymeric amine.

The CRC L-37 test is a laboratory performance test for automotive gear lubricants in axles at high-speed, low-torgue and low-speed, high-torque conditions. The procedure uses a hypoid differential housing assembly, 5.86 ratio, standard differential with uncoated gear and drive pinion. However, a test run may be made using a coated gear and drive pinion. Prior to each test the entire axle assembly is cleaned, no disassembly is allowed. This test is a candidate test for ASTM Special Technical Publication 512–637. The following is a brief summary of test procedure:

Sequence 1—High-speed, low-torque operation: The test unit is charged with six pints (2.82) of test oil, then run for 100 minutes at 440 wheel rpm and 4730 in-lb (535 N-M) torque per wheel. During this time, the axle sump temperature is maintained at 297 ±3° F. (147±1.5° C.). For purposes of cooling, a water spray over the differential housing is used. At the end of the 100 minute break-in an optional visual inspection is permitted.

Note 2: For purposes of evaluating lower viscosity lubricants (i.e., 75W types), the test lubricant temperature is controlled at 220±3° F. (105±1.1° C.).

Sequence 2—Low-speed, high torque operation: Run the test axle for 24 hours at 80 wheel rpm, 20,900 in-lb (2.35 kN-M) torque per wheel and an axle sump temperature of 275±3° F. (135±1.4° C.).

Note 3: For purposes of evaluating lower viscosity lubricants (i.e. 75 W types), the sump temperature is controlled at 200±3° F. (93±1.0° C.).

At the end of the low-speed, high-torque phase, the test is completed; the ring and pinion are removed and rated for various forms of gear distress.

TABLE 2

High Temperature Oven Stability Test

| | Additive Concentrate in Test Oil Wt. % | Results of Thermal and Oxidative Stability Test at 275° F. for 96 Hours |
|---|---|---|
| Sulfurized Isobutylene Used in Example 1 as Reactant | 2.80 | Extensive decomposition noted - significant quantities of degradation products |

TABLE 2-continued

| | High Temperature Oven Stability Test | |
|---|---|---|
| | Additive Concentrate in Test Oil Wt. % | Results of Thermal and Oxidative Stability Test at 275° F. for 96 Hours |
| | | formed - Quantity of solids are approximately 5% of Test Oil. |
| Example 1 - Reaction Product of above sulfurized olefin and succinimide | 2.80 | No significant decomposition is noted. |

The high temperature stability test is performed by immersing a freshly polished steel coupon in the test fluid and raising the temperature to 275° F. for a period of 96 hours and then examining the steel rod and lubricating fluid visually for evidence of thermal oxidative decomposition. NOTE: Test oil of Table 2 is identical to fully formulated test oil described in Table 1.

As can be clearly seen from severe oxidation and thermal stability test results of Table 2, the reaction product of Example 1 possesses significantly improved thermal and oxidative stability properties when compared to the unreacted sulfurized isobutylene.

Although the present invention has been described with preferred embodiments, it is to be understood that modifications and variations may be resorted to, without departing from the spirit and scope of this invention, as those skilled in the art will readily understand. Such modifications and variations are considered to be within the purview and scope of the appended claims.

What is claimed is:

1. A multifunctional additive product having antiwear properties, friction modifying characteristics and thermal and oxidative stability, suitable for use in an oil of lubricating viscosity or grease thereof prepared in a process comprising reacting (1) in a suitable reaction zone at temperatures of from about 140°–180° C. and pressures of from about 300–900 psi a $C_2$-$C_{36}$ olefin having at least one olefinic double bond with elemental sulfur in molar ratios of sulfur to olefin of from 1.7:1 to about 2.3:1, said first reaction product containing at least about 40–55 wt. % sulfur and (2) thereafter reacting the product of (1) with a nitrogen-containing polymeric compound having at least one free amine group therein and having a molecular weight between about 300 to about 30,000, at temperatures of from 30° C. to 150° C. and in a weight ratio of nitrogen compound to (1) from about 1.40:1 to about 1:1.

2. The additive product of claim 1 wherein the reaction pressure in said step (1) varies from about 750 to 850 psi and the temperature from about 158 to about 165° C. and the molar ratio of sulfur to olefin varies from about 1.9:1 to about 2.1:1 and wherein the weight ratio of nitrogen-containing compound to sulfurized olefin in said step (2) varies from 1:20 to about 1:5.

3. The additive product of claim 1 wherein said step (1) is carried out in the presence of a rate accelerating catalyst, selected from the group consisting essentially of n-butylamine, di-n-butylamine, n-octylamine, triethylamine, diisopropylamine, cyclohexylamine, dicyclohexylamine, guinoline and attapulgite acid clay.

4. The additive product of claim 1 wherein the olefinic compound is selected from the group consisting essentially of ethylene, propylene, 1-butene, cis and trans-2-butene, isobutylene, diisobutylene, triisobutylene, pentene, cyclopentene, hexene, cyclohexene, octene, 1-decene, butadiene, isoprene, divinyl benzene, pinene, p-menthene and limonene or mixtures thereof.

5. The additive product of claim 4 wherein the olefinic compound is isobutylene.

6. The additive product of claim 5 wherein the nitrogen-containing polymeric compound is the reaction product of polyisobutenyl succinic anhydride and tetraethylene pentamine.

7. The additive product of claim 1 wherein the nitrogen-containing polymeric compound is the reaction product of an alkenyl succinic anhydride or acid and a polyalkyleneamine of the general formula:

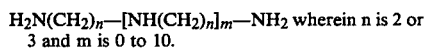

$H_2N(CH_2)_n$—$[NH(CH_2)_n]_m$—$NH_2$ wherein n is 2 or 3 and m is 0 to 10.

8. The additive product of claim 7 wherein the succinic compound, is polyisobutenyl succinic anhydride and the amine is tetraethylene pentamine.

9. The additive product of claim 1 wherein the olefinic compound is isobutylene.

10. The additive product of claim 1 wherein said step (1) product is prepared in the absence of added $H_2S$.

11. A process for making a multifunctional additive product having antiwear, friction modifying, thermal and oxidative stability characteristics suitable for use in oils of lubricating viscosity or greases prepared therefrom comprising (1) reacting in a suitable reaction zone a $C_2$-$C_{36}$ olefinic hydrocarbyl compound having at least one olefinic double bond with elemental sulfur at elevated temperatures of from about 140 to about 180° C. and pressures of from about 300 to about 900 psi in a molar ratio of sulfur to olefin of from about 1.7:1 to about 2.3:1 producing a sulfurized additive product containing at least about 40–55 wt. % sulfur and (2) reacting said product of (1) with a nitrogen containing polymeric compound having at least one free amine group in a weight ratio of said nitrogen-containing compound to (1) of from about 1:40 to about 1:1 at temperatures of from about 30° C. to about 150° C.

12. The process in accordance with claim 11 wherein the pressure varies from about 750 to about 850 psi and the temperature varies from about 158 to 165° C. and the molar ratio of reactant sulfur to olefin varies from about 1.9:1 to about 2.1:1 and the weight ratio of the product of (1) to the nitrogen-containing polymeric substance varies from about 1:20 to about 1:5.

13. The process of claim 12 wherein the molar ratio of sulfur to olefin varies from about 1.95:1 to about 2.05:1 and the weight ratio of reaction product of (1) to nitrogen containing polymeric compound varies from about 1:10 to about 1:14.

14. The process in accordance with claim 11 wherein said step (1) is carried out in the presence of a rate accelerating catalyst.

15. The process in accordance with claim 14 wherein said rate accelerating catalyst is selected from the group consisting essentially of n-butylamine, di-n-butylamine, n-octylamine, triethylamine, diisopropylamine, cyclohexylamine, dicyclohexylamine, guinoline and attapulgite acid clay.

16. The process in accordance with claim 12 wherein the olefinic compound is selected from the group consisting essentially of ethylene, propylene, 1-butene, cis and trans-2-butene, isobutylene, diisobutylene, triisobutylene, pentene, cyclopentene, hexene, cyclohexene, octene, 1-decene, butadiene, isoprene, divinyl benzene, pinene, p-menthene and limonene.

17. The process of claim 11 wherein the nitrogen containing polymeric substance is the reaction product of polyisobutenyl succinic anhydride and tetraethylene pentamine.

18. The process of claim 17 wherein the nitrogen-containing polymeric substance is the reaction product of an alkenyl succinic anhydride or acid and a polyalkyleneamine of the general formula:

$$H_2N(CH_2)_n-[NH(CH_2)_n]_m-NH_2$$

wherein n is preferably 2 or 3 and m is 0 to 10.

19. The process in accordance with claim 11 wherein the product of said step (1) is prepared in the absence of added $H_2S$.

20. A composition comprising major proportion of an oil of lubricating viscosity or grease prepared therefrom and a minor multifunctional antiwear, friction modifying, thermal and oxidative stabilizing proportion of an additive prepared by a process comprising (1) directly reacting under pressures of from about 300 to about 900 psi and temperatures of from about 140 to 180° C. at least one olefinically unsaturated compound or mixtures thereof having from about 2 to about 36 carbon atoms and elemental sulfur in a molar ratio of sulfur to olefin of from about 1.7:1 to about 2.3:1 in the absence of added hydrogen sulfide, thereby producing a low. viscosity liquid containing sulfurized reaction product having at least about 40 to about 55 wt. % of sulfur and (2) thereafter reacting the product of (1) with a nitrogen-containing polymeric compound having a molecular weight of from about 300 to about 30,000 having at least one free amine group at temperatures of from about 40 to about 150° C. in a weight ratio of sulfurized product to nitrogen containing compound of from about 1:40 to about 1:1 for a time sufficient to obtain the desired sulfurized olefin/nitrogen-containing polymeric reaction product.

21. The composition of claim 20 wherein molar ratio of sulfur to olefin varies from about 1.9:1 to about 2.1:1 and the weight ratio of sulfurized reaction product of (1) to nitrogen-containing compound varies from about 1:40 to about 1:1.

22. The composition of claim 20 wherein said major amount is an oil of lubricating viscosity.

23. The composition of claim 22 wherein said oil is selected from mineral oils, synthetic oils or mixtures thereof.

24. The composition of claim 23 wherein said oil is a mineral oil or mixtures thereof.

25. The composition of claim 23 wherein said oil is a synthetic oil or mixture thereof, 26. The composition of claim 20 wherein said major amount is a grease.

* * * * *

UNITED STATES PATENT AND TRADEMARK OFFICE
CERTIFICATE OF CORRECTION

PATENT NO. : 4,654,156

DATED : March 31, 1987

INVENTOR(S) : Andrew G. Horodysky & Derek A. Law

It is certified that error appears in the above-identified patent and that said Letters Patent is hereby corrected as shown below:

| | |
|---|---|
| Col. 1, Line 5 | "in" should be --to--. |
| Col. 1, Line 6 | "entitle" should be --entitled-- |
| Col. 4, Line 21 | "properties." should be --properties,-- |
| Col. 4, Line 26 | "phosohours" should be --phosphorus-- |
| Col. 4, Line 33 | "aoainst" should be --against-- |
| Col. 5, Line 60 | "eguipped" should be --equipped-- |
| Col. 6, Line 27 | "low-torgue" should be --low torque-- |
| Col. 7, Line 64 | "guinoline" should be --quinoline-- |
| Col. 8, Claim 15, Line 60 | "guinoline" should be --quinoline-- |
| Col. 9, Claim 20, Line 16 | insert --a-- before "Major" |
| Col. 10, Claim 20, Line 4 | insert --and-- after "30,000" |
| Col. 7, Line 51 | "1.40:1" should be --1:40-- |

Signed and Sealed this

Eighth Day of September, 1987

Attest:

DONALD J. QUIGG

Attesting Officer

Commissioner of Patents and Trademarks